(12) United States Patent
Ohashi

(10) Patent No.: US 12,054,078 B2
(45) Date of Patent: Aug. 6, 2024

(54) VEHICLE SEAT

(71) Applicant: TOYOTA BOSHOKU KABUSHIKI KAISHA, Aichi-ken (JP)

(72) Inventor: Koji Ohashi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 39 days.

(21) Appl. No.: 17/345,700

(22) Filed: Jun. 11, 2021

(65) Prior Publication Data
US 2021/0387552 A1 Dec. 16, 2021

(30) Foreign Application Priority Data
Jun. 16, 2020 (JP) ................................. 2020-103639

(51) Int. Cl.
*B60N 2/42* (2006.01)
*B60N 2/16* (2006.01)

(52) U.S. Cl.
CPC ......... *B60N 2/1615* (2013.01); *B60N 2/4228* (2013.01)

(58) Field of Classification Search
CPC ............................ B60N 2/1615; B60N 2/4228
See application file for complete search history.

(56) References Cited

U.S. PATENT DOCUMENTS

| | | | | |
|---|---|---|---|---|
| 6,502,798 | B1 * | 1/2003 | Frohnhaus | B60N 2/165 248/421 |
| 6,709,053 | B1 * | 3/2004 | Humer | B60N 2/42709 297/216.14 |
| 2003/0222192 | A1 * | 12/2003 | Ikegaya | B60N 2/165 248/421 |
| 2008/0148517 | A1 * | 6/2008 | Rosato | B60N 2/236 16/257 |
| 2008/0224519 | A1 * | 9/2008 | Ventura | B60N 2/1896 297/313 |
| 2012/0049597 | A1 * | 3/2012 | Brewer | B60N 2/06 297/313 |
| 2017/0341530 | A1 * | 11/2017 | Shinozaki | B60N 2/42736 |

(Continued)

FOREIGN PATENT DOCUMENTS

DE 102016200124 A1 7/2017
JP 2017-206123 A 11/2017

OTHER PUBLICATIONS

Japanese Office Action in counterpart application No. JP2020-103639, dated Sep. 12, 2023.

*Primary Examiner* — Amy J. Sterling
(74) *Attorney, Agent, or Firm* — Greenblum & Bernstein, P.L.C.

(57) ABSTRACT

A vehicle seat includes a lower member, a frame member, and a link member connected to the lower member and the frame member. The link member includes a first circular hole portion connected to the lower member so as to pivot about an axis in a width direction of a vehicle, a second circular hole portion connected to the frame member, a main body of plate shape in which the first circular hole portion and the second circular hole portion are formed, a flange projecting from the main body in a direction crossing the main body, a recess formed to bring the flange closer to an imaginary straight line connecting a center of the first circular hole portion with a center of the second circular hole portion, and an offset portion formed to shift the main body in a thickness direction of the main body.

9 Claims, 2 Drawing Sheets

(56) References Cited

U.S. PATENT DOCUMENTS

| | | | | |
|---|---|---|---|---|
| 2018/0339611 A1* | 11/2018 | Matsui | ................ | B60N 2/0732 |
| 2021/0001755 A1* | 1/2021 | Sulaiman | ............. | B60N 2/1615 |
| 2021/0261023 A1* | 8/2021 | Muehlenbrock | ....... | B60N 2/682 |

\* cited by examiner

VEHICLE SEAT

This nonprovisional application is based on Japanese Patent Application No. 2020-103639 filed on Jun. 16, 2020 with the Japan Patent Office, the entire contents of which are hereby incorporated by reference.

BACKGROUND

Field

The present disclosure relates to a vehicle seat.

Description of the Background Art

A vehicle seat of a car or the like has conventionally been provided with an up-and-down mechanism that adjusts a seat height of a seat cushion so as to secure a field of view suitable for a body size of an occupant sitting on the vehicle seat. In this up-and-down mechanism, a driving force for moving up and down is transferred to a link member via a pinion gear and a sector gear to cause the link member to pivot, enabling up-and-down operations.

Japanese Patent Laying-Open No. 2017-206123 discloses that a weak portion that preferentially buckles upon receipt of an input of external load is provided in the link member.

SUMMARY

Upon input of an external load to a vehicle so as to tilt a seat back backward, such as in the event of a rear collision, reduction of an angle of backward tilt is requested for protecting an occupant in a rear seat. One conceivable measure is to increase the strength or rigidity of a frame.

On the other hand, there is also a request for reducing cracks in or damage a seat frame and its peripheral part in the event of a rear collision.

If the measure taken to increase the strength or rigidity of the frame increases the mass of the seat back, an input to a sector gear of the up-and-down mechanism increases in a rear collision, easily causing damage such as chipped teeth.

As described above, reducing an angle of backward tilt of the seat back and decreasing input to the sector gear in a rear collision are contradicting technical problems. The structure disclosed in Japanese Patent Laying-Open No. 2017-206123 does not necessarily solve the above-mentioned two problems satisfactorily.

An object of the present disclosure is to provide a vehicle seat that is able to reduce an angle of backward tilt of a seat back and also decrease input to a sector gear when an external load is input.

A vehicle seat according to an aspect of the present disclosure includes a lower member on a floor side of a vehicle, a frame member provided above the lower member and extending in a front-rear direction of the vehicle, and a link member connected to the lower member and the frame member. The link member includes a first circular hole portion connected to the lower member so as to pivot about an axis in a width direction of the vehicle, a second circular hole portion connected to the frame member, a main body of plate shape in which the first circular hole portion and the second circular hole portion are formed, a flange projecting from the main body in a direction crossing the main body, a recess formed to bring the flange closer to an imaginary straight line connecting a center of the first circular hole portion with a center of the second circular hole portion, and an offset portion formed to shift the main body in a thickness direction of the main body.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
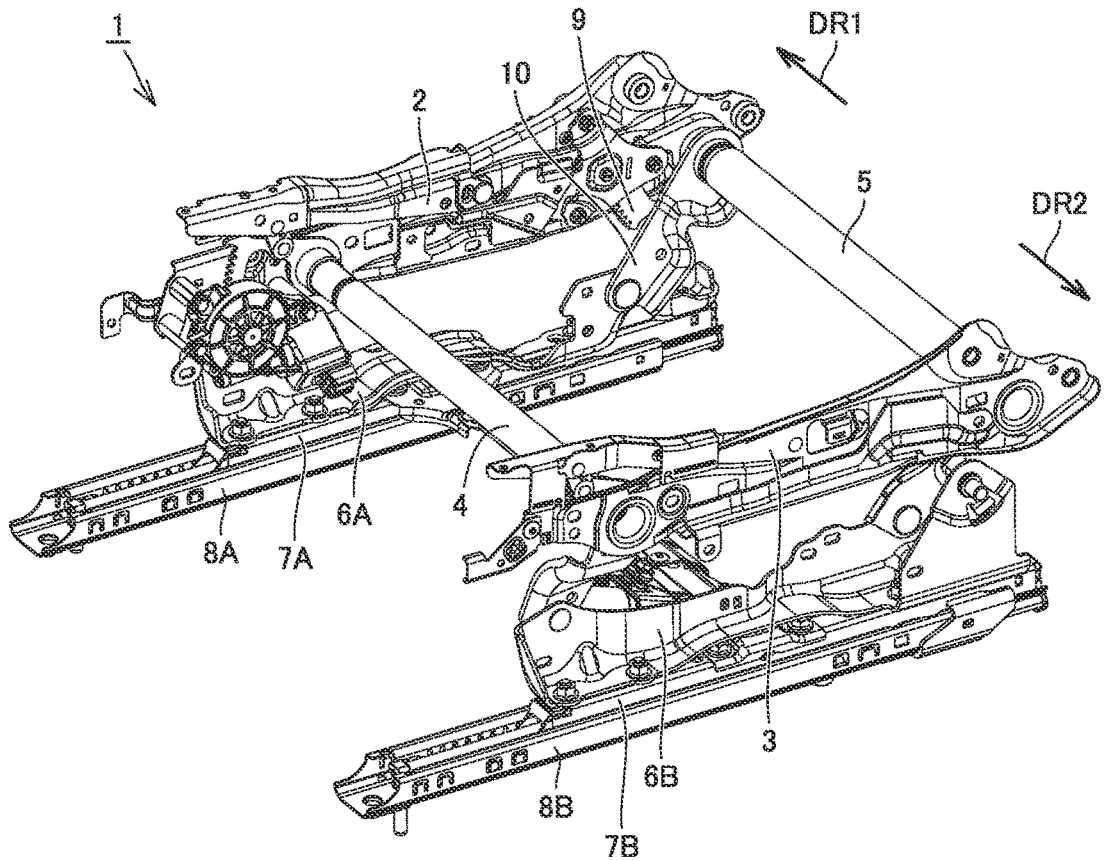
FIG. 1 shows a cushion frame included in a vehicle seat according to an embodiment of the present disclosure.

An embodiment of the present disclosure will be described below. The same or corresponding parts are designated by the same reference numerals and may not be described repeatedly.

In the embodiment described below, when reference is made to a number, an amount, or the like, the scope of the present disclosure is not necessarily limited to the number, the amount, or the like unless otherwise specified. In the following embodiment, each component is not necessarily essential to the present disclosure unless otherwise specified.

The present embodiment will illustrate a structure of a rear outer link member of a car seat, but the scope of the present disclosure is not limited thereto.

In the present embodiment, "front" and "rear" mean the front side and the rear side as viewed from the occupant sitting in the car seat, and "front-rear direction" means a direction connecting the front side with the rear side. "Left" and "right" mean the left side and the right side as viewed from the occupant sitting in the car seat, and "width direction" means a direction connecting the left side with the right side. "Above" and "below" mean the upper side and the lower side as viewed from the occupant sitting in the car seat, and "up-down direction" means a direction connecting the upper side with the lower side.

FIG. 1 shows a cushion frame 1. Cushion frame 1 forms the framework of a seat cushion on which occupant can sit in a front seat of a car, and is formed of combined metal members.

As shown in FIG. 1, cushion frame 1 includes an outer side frame 2, an inner side frame 3, a front rod member 4, a rear rod member 5, bracket members 6A, 6B, upper rails 7A, 7B, lower rails 8A, 8B, a sector gear 9, and a link member 10.

Outer side frame 2 is a frame member extending, on the outer side in the width direction of the car (the side indicated by the arrow DR1), in the front-rear direction. Inner side frame 3 is a frame member extending, on the inner side in the width direction of the car (the side indicated by the arrow DR2), in the front-rear direction.

Front rod member 4 is a frame member coupling, on the front side, outer side frame 2 with inner side frame 3 in the width direction. Rear rod member 5 is a frame member coupling, on the rear side, outer side frame 2 with inner side frame 3 in the width direction.

Bracket members 6A, 6B are fixed to upper rails 7A, 7B, respectively. Upper rails 7A, 7B slidably move in the front-rear direction with respect to lower rails 8A, 8B fixed to the floor surface of the car.

Sector gear 9 meshes with a pinion gear (not shown). Link member 10 is provided so as to pivot about an axis in the width direction with respect to bracket member 6A and outer side frame 2. A driving force for moving up and down is transmitted to link member 10 via the pinion gear and sector gear 9. As link member 10 pivots, up-down operations of a sitting surface are allowed.

Figure 2:
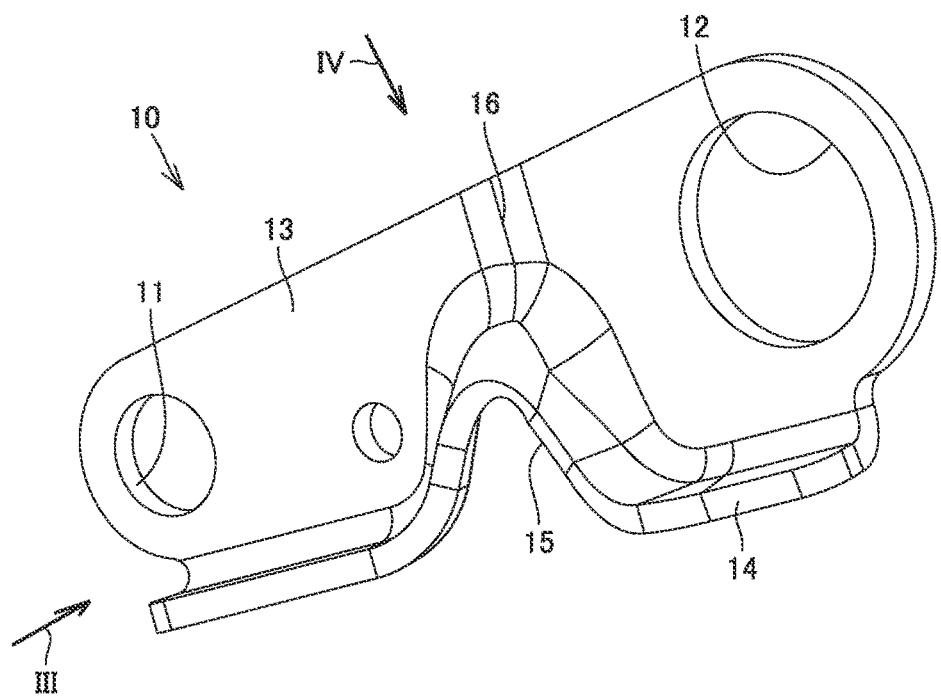
FIG. 2 shows a link member included in the cushion frame of FIG. 1.
Figure 3:
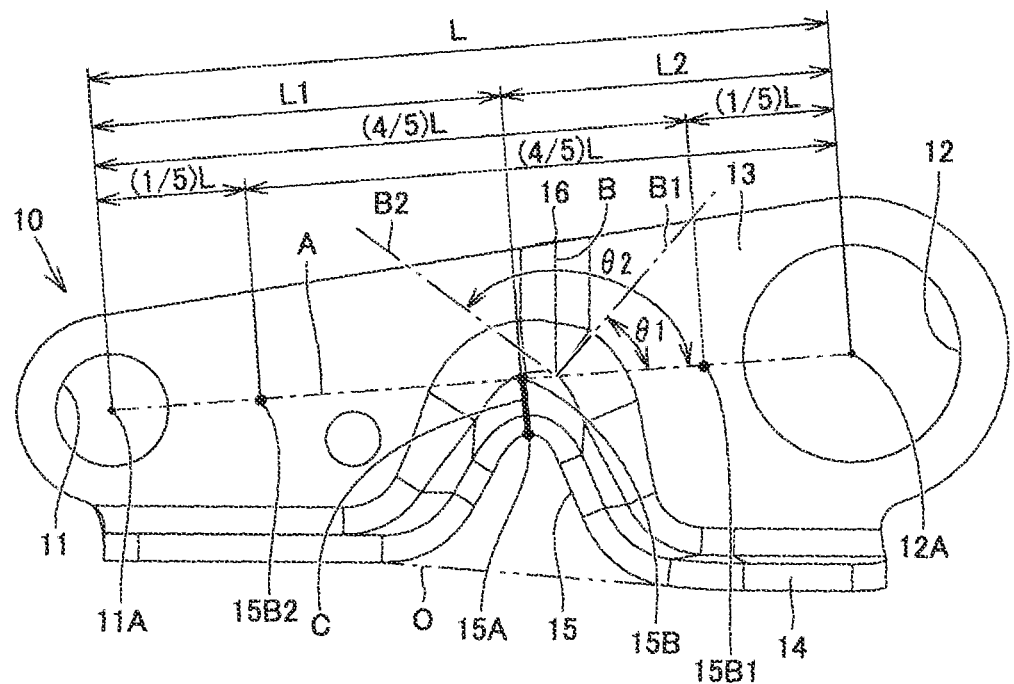
FIG. 3 shows the link member shown in FIG. 2, which is viewed from a direction indicated by the arrow III of FIG. 2.
Figure 4:
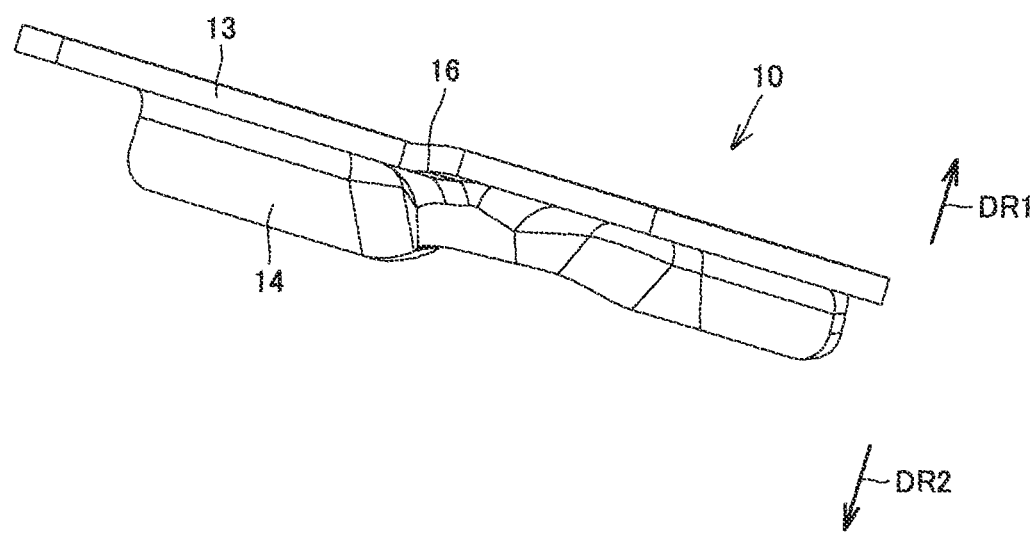
FIG. 4 shows the link member shown FIG. 2, which is viewed from a direction indicated by the arrow IV of FIG. 2.

FIG. 2 shows link member 10. FIGS. 3 and 4 show link member 10, which is viewed from the direction indicated by the arrow III and the direction indicated by the arrow IV of FIG. 2, respectively.

As shown in FIGS. 2 to 4, link member 10 includes a first circular hole portion 11, a second circular hole portion 12, a main body 13, a flange 14, a recess 15, and an offset portion 16.

First circular hole portion 11 is connected to bracket member 6A. Second circular hole portion 12 is connected to outer side frame 2 and rear rod member 5.

In the present embodiment, a straight line connecting a center 11A of first circular hole portion 11 with a center 12A of second circular hole portion 12 is referred to as "imaginary straight line A".

First circular hole portion 11 and second circular hole portion 12 are formed in main body 13 of plate shape. Flange 14 is formed to project from main body 13 in a direction (width direction) crossing main body 13 at an approximately right angle.

Recess 15 is formed by flange 14 being bent so as to be closer to imaginary straight line A connecting the center of first circular hole portion 11 with the center of second circular hole portion 12. In FIG. 3, a region in which flange 14 is closer to imaginary straight line A from a two-dot chain line O corresponds to recess 15. In recess 15, flange 14 is formed in a curve in its entirety.

Offset portion 16 is formed to shift main body 13 in the thickness direction of main body 13. In the present embodiment, the rear side (second circular hole portion 12 side) of main body 13 is formed to shift toward the outer side in the width direction (the direction indicated by the arrow DR1) with offset portion 16 as a boundary, as shown in FIG. 4.

Offset portion 16 extends in the direction (along line B in FIG. 3) from an outside edge of main body 13 opposite to flange 14 toward the vertex of recess 15. In an example, an angle of intersection between the direction of extension (line B in FIG. 3) of offset portion 16 and imaginary straight line A is about not less than 45° (θ1 in FIG. 3) and not greater than 135° (θ2 in FIG. 3). In other words, in the above example, offset portion 16 extends in a direction between the direction of imaginary straight line B1 and the direction of imaginary straight line B2 in FIG. 3.

Flange 14, recess 15, and offset portion 16 are formed by, for example, pressing a plate-shaped iron member. Recess 15 and offset portion 16 are disposed in a central portion of link member 10 in the front-rear direction. In one example, X is about not less than 0.25 and not greater than 4 when L1:L2=1:X, where L1 represents a direct distance between center 11A of first circular hole portion 11 and a point of intersection 15B between a perpendicular C (a thick line in FIG. 3) drawn from a vertex 15A of recess 15 to imaginary straight line A and imaginary straight line A, and L2 represents a direct distance between point of intersection 15B and center 12A of second circular hole portion 12. In other words, in the above example, recess 15 or vertex 15A is formed such that point of intersection 15B is located between an imaginary point 15B1 and an imaginary point 15B2 on imaginary straight line A.

The car seat according to the present embodiment includes bracket member 6A (lower member) provided on the floor surface of the car (vehicle), outer side frame 2 (frame member) provided above bracket member 6A and extending in the front-rear direction of the car, and link member 10 connected to bracket member 6A and outer side frame 2, as described above.

Link member 10 includes first circular hole portion 11 connected to bracket member 6A so as to pivot about an axis in a width direction of a vehicle, second circular hole portion 12 connected to outer side frame 2, main body 13 of plate shape in which first circular hole portion 11 and second circular hole portion 12 are formed, flange 14 projecting from main body 13 in a direction crossing main body 13, recess 15 formed to bring flange 14 closer to imaginary straight line A connecting center 11A of first circular hole portion 11 with center 12A of second circular hole portion 12, and offset portion 16 formed to shift main body 13 in a thickness direction of main body 13.

Offset portion 16 extends from the outside edge of main body 13 opposite to flange 14 toward recess 15. More specifically, offset portion 16 extends so as to be closer to vertex 15A of recess 15 from the outside edge of main body 13 opposite to flange 14.

With the above configuration, a deformation of link member 10 in the width direction can be induced by offset portion 16 formed in the central portion of link member 10, thus decreasing input to sector gear 9 in a rear collision to reduce chipping of teeth of sector gear 9. Herein, flange 14 with recess 15 can reduce an excessive deformation of link member 10 in the width direction, that is, regulate a deformation of link member 10, also reducing an angle of backward tilt of a seat back in a rear collison.

The present embodiment has described an example in which recess 15 is formed in a curve in its entirety, but the scope of the present disclosure is not limited thereto. Recess 15 may be formed linearly in part or in its entirety (e.g., an approximately inverted-trapezoid-shaped recess). Additionally, an angle of intersection between the direction of extension of offset portion 16 (line B) and imaginary straight line A and a ratio between L1 and L2 are not limited to the above-mentioned ones.

The above contents are summarized as follows.

A vehicle seat according to one embodiment includes a lower member on a floor side of a vehicle, a frame member provided above the lower member and extending in a front-rear direction of the vehicle, and a link member connected to the lower member and the frame member. The link member includes a first circular hole portion connected to the lower member so as to pivot about an axis in a width direction of the vehicle, a second circular hole portion connected to the frame member, a main body of plate shape in which the first circular hole portion and the second circular bole portion are formed, a flange projecting from the main body in a direction crossing the main body, a recess formed to bring the flange closer to an imaginary straight line connecting a center of the first circular hole portion with a center of the second circular hole portion, and an offset portion formed to shift the main body in a thickness direction of the main body.

In one embodiment, in the vehicle seat, the offset portion extends from an outside edge of the main body opposite to the flange toward the recess.

In one embodiment, in the vehicle seat, the offset portion extends from an outside edge of the main body opposite to the flange so as to be closer to a vertex of the recess.

In one embodiment, in the vehicle seat, the recess is formed in a curve.

In one embodiment, in the vehicle seat, an angle of intersection between a direction of extension of the offset portion and the imaginary straight line is not less than 45° and not greater than 135°.

In one embodiment, in the vehicle seat, X is not less than 0.25 and not greater than 4 when L1:L2=1:X, where L1 represents a direct distance between the center of the first circular hole portion and a point of intersection between a perpendicular drawn from a vertex of the recess to the imaginary straight line and the imaginary straight line, and L2 represents a direct distance between the center of the second circular hole portion and the point of intersection between the perpendicular drawn from the vertex of the recess to the imaginary straight line and the imaginary straight line.

In one embodiment, in the vehicle seat, the link member is a rear outer link member located, in the vehicle seat, on an outer side in the width direction and on a rear side of the vehicle.

The vehicle seat according to the present embodiment can reduce the angle of backward tilt of the seat back and also decrease input to the sector gear when an external load is input.

Although the embodiment of the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle seat comprising:
    a lower member on a floor side of a vehicle;
    a frame member provided above the lower member and extending in a front-rear direction of the vehicle; and
    a link member connected between the lower member and the frame member,
    wherein the link member includes
        a first circular hole portion connected to the lower member so as to pivot about an axis in a width direction of the vehicle,
        a second circular hole portion connected to the frame member,
        a main body of plate shape in which the first circular hole portion and the second circular hole portion are formed,
        a flange projecting from the main body in a direction crossing the main body,
        a recess formed to bring the flange closer to an imaginary straight line connecting a center of the first circular hole portion with a center of the second circular hole portion, and
        an offset portion formed to shift the main body in a thickness direction of the main body,
    wherein the offset portion extends from an outside edge of the main body opposite to the flange to the recess.

2. The vehicle seat according to claim 1, wherein the offset portion extends from an outside edge of the main body opposite to the flange so as to be closer to a vertex of the recess.

3. The vehicle seat according to claim 1, wherein the recess is formed in a curve.

4. The vehicle seat according to claim 1, wherein an angle of intersection between a direction of extension of the offset portion and the imaginary straight line is not less than 45° and not greater than 135°.

5. The vehicle seat according to claim 1, wherein X is not less than 0.25 and not greater than 4 when L1: L2=1: X, where
    L1 represents a direct distance between the center of the first circular hole portion and a point of intersection between a perpendicular drawn from a vertex of the recess to the imaginary straight line and the imaginary straight line, and
    L2 represents a direct distance between the center of the second circular hole portion and the point of intersection between the perpendicular drawn from the vertex of the recess to the imaginary straight line and the imaginary straight line.

6. The vehicle seat according to claim 1, wherein the link member is a rear outer link member located, in the vehicle seat, on an outer side in the width direction and on a rear side of the vehicle.

7. The vehicle seat according to claim 1, wherein the frame member is included in the framework of a seat cushion on which an occupant of the vehicle can sit.

8. The vehicle seat according to claim 1, further comprising:
    another frame member extending in the front-rear direction of the vehicle, the frame member and the other frame member being arranged in the width direction of the vehicle; and
    a pair of rod members coupling the frame member and the other frame member in the width direction of the vehicle.

9. The vehicle seat according to claim 1, further comprising:
    another frame member extending in the front-rear direction of the vehicle, the frame member and the other frame member being arranged in the width direction of the vehicle; and
    a pair of rod members coupling the frame member and the other frame member in the width direction of the vehicle,
    wherein the frame member, the other frame member, and the pair of rod members are included in the framework of a seat cushion on which an occupant of the vehicle can sit.

* * * * *